United States Patent Office

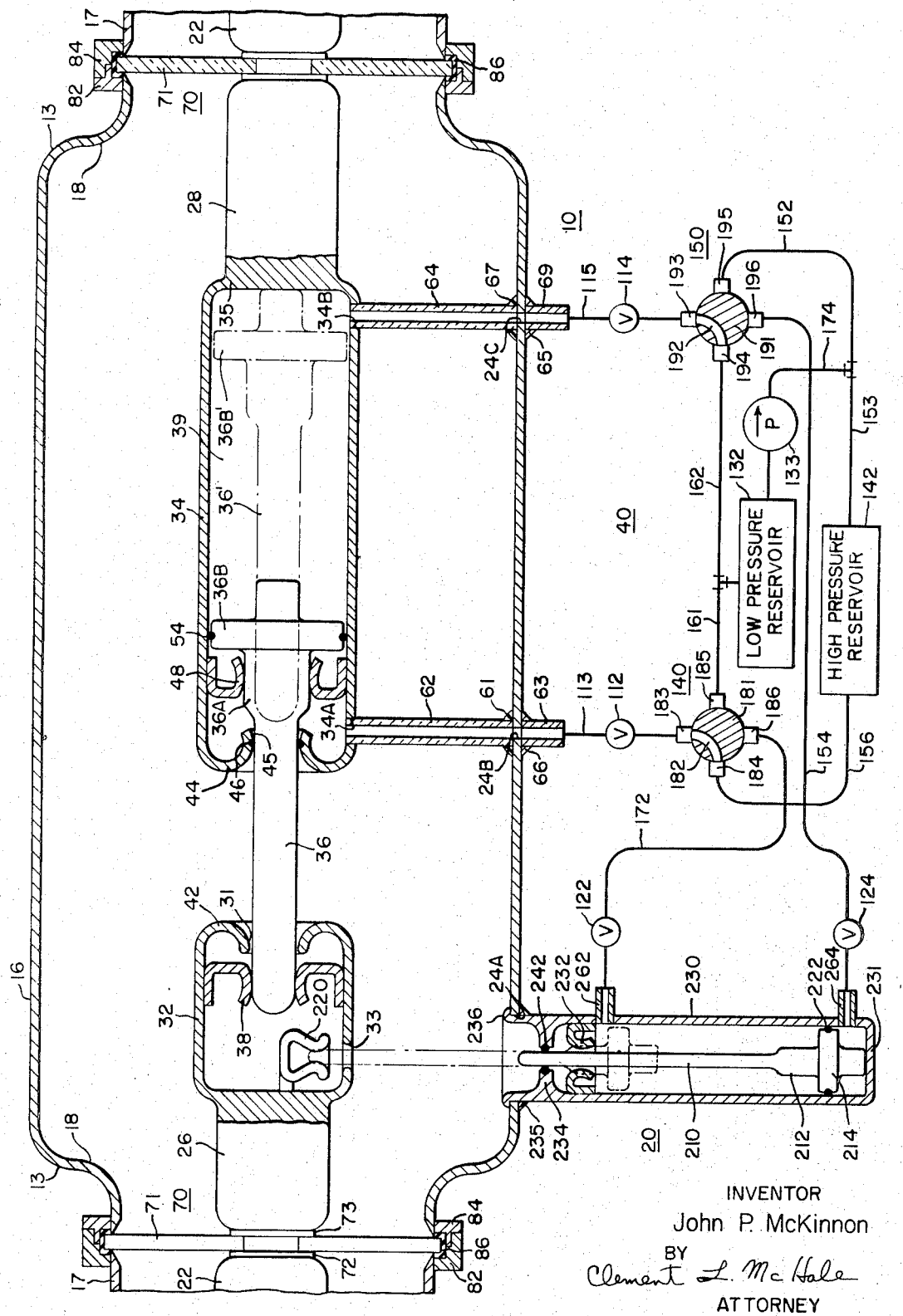

3,356,798
Patented Dec. 5, 1967

3,356,798
DISCONNECT SWITCH
John P. McKinnon, Monroeville, Pa., assignor to Westinghouse Electric Corporation, Pittsburgh, Pa., a corporation of Pennsylvania
Filed Dec. 13, 1965, Ser. No. 513,429
7 Claims. (Cl. 200—48)

ABSTRACT OF THE DISCLOSURE

An improved reciprocating type disconnect switch in which the main switch blade and the grounding switch blade are both fluid operated and in which the main housing is hollow and cylindrical and substantially filled with an electrically insulated gas under pressure.

---

This invention relates to disconnect switches and, more particularly, to disconnect switches adapted for use in high voltage electric power distribution systems.

Due to the rapidly increasing electrical loads in densely populated urban areas, a problem arsies in efficiently transmitting large amounts or blocks of electric power into such heavily populated areas. It is known that electric power can be brought into such areas at very high voltage levels efficiently by emyploying enclosed underground conductors. In order to distribute the large amounts of electric power brought into urban areas by such underground conductors, a compact substation structure is required to reduce the space or area of the substation that would otherwise be necessary. Such a substation is disclosed in copending application Ser. No. 474,779, filed July 26, 1965, by D. L. Whitehead and assigned to the same assignee as the present application. Such a substation requires a compact disconnect structure of the enclosed type, such as is disclosed in copending application Ser. No. 474,755, filed July 26, 1965, by George Siviy and Chester W. Upton, Jr., and assigned to the same assignee as the present application. This disconnect switch structure disclosed in the copending application just mentioned offers a number of important advantages when employed in a compact substation but includes an external means for actuating the switch which must be mechanically coupled to switch parts inside an enclosure. It is therefore desirable to provide an improved disconnect switch of the type described which provides all of the advantages of the disconnect switch described in the copending application just mentioned and which also eliminates the need for a mechanical coupling from an external actuating means to the switch parts inside an enclosure.

It is an object of this invention to provide a new and improved disconnect switch of the enclosed type.

Another object of the invention is to provide an improved disconnect switch of the fluid operated type.

A further object of this invention is to provide an improved means for grounding the contacts of a disconnect switch of the reciprocating type.

A still further object of this invention is to provide an improved disconnecting switch of the reciprocating type.

Other objects of the invention will, in part, be obvious and will, in part, appear hereinafter.

For a fuller understanding of the nature and objects of the invention, reference may be had to the following detailed description taken in conjunction with the accompanying drawing in which the single feature is a view, partly in elevation and partly diagrammatic, of a disconnect switch embodying the principal features of the invention.

Referring now to the drawing, the structure shown therein comprises one pole unit of a high voltage disconnect switch 10 which is adapted for use in a distribution substation of the type described in the above-mentioned copending application of D. L. Whitehead. Additional pole units similar to the one shown may be provided as required in a particular application. In general, each pole unit of the disconnect switch 10 is adapted to be connected electrically in series with, and structurally in line between, the spaced ends of two high voltage bus structure sections each of which includes a generally cylindrical bus conductor 22 which is enclosed in a generally cylindrical housing 17. The bus conductors 22 may be supported inside the associated cylindrical housings 17 by suitable spaced electrically insulating means, such as generally disc-shaped insulators (not shown), as disclosed in the above-mentioned copending application of D. L. Whitehead. The housings 17 and the disconnect switch 10 preferably contain an electrically insulating gas, such as sufur hexafluoride ($SF_6$), under pressure in order to reduce the electrical clearances that would otherwise be required in a high voltage application between the different portions of the bus structures and the different portions of the disconnect switch structure 10. As will be explained herein more fully, provision is made for sectionalizing the bus conductor housings and compartmentalizing the disconnect switch 10 to permit components of the switch structure to be taken out of service without affecting the operation of the remaining components of an overall substation structure.

More specifically, the disconnect switch 10 comprises a generally cylindrical housing 16 which is formed from a suitable electrically conducting material which is normally maintained at ground potential to insure the safety of operating personnel. The first and second axially spaced generally cylindrical switch conductors 26 and 28 are disposed inside and spaced from the switch housing 16 which contains an electrically insulating gas as previously mentioned. In order to support the switch conductors 26 and 28, as well as other switch parts, within the switch housing 16, suitable spaced electrically insulating means, such as the combined insulator and barrier units 70 which will be described in greater detail hereinafter, may be provided. In order to limit the voltage or potential stresses during certain operating conditions of the disconnect switch 10, a generally cylindrical grading or corona shield or electrode is provided with one end of the shield 32 formed integrally with or attached to one end of the switch conductor 26. Similarly, a generally cylindrical grading or corona shield or elecrode 34 is provided with one end of the shield 34 formed integrally with or attached to one end of the switch conductor 28. In order to minimize voltage or potential stresses between electrodes 32 and 34, the electrode 32 has a generally spherical end 42 which is spaced from a generally spherical end 44 on the electrode 34.

The disconnect switch 10 also includes a reciprocating switch blade or axially movable bridging conductor 36 which engages a plurality of spaced stationary or breakjaw contact fingers 38 disposed inside the electrode 32 through an opening 31 when the switch blade 36 is in the closed position. The switch blade 36 is slidably disposed inside the shield or electrode 34 when the disconnect switch 10 is in the open position, as indicated in phantom in the drawing. In order to permit the application of fluid pressure to actuate the switch blade 36, a piston member 36B is formed integrally with or mounted on the switch blade 36 adjacent to one end. The switch blade 36 also includes an enlarged portion 36A which is adapted to function as a contact area which engages a plurality of contact fingers 48 which are mounted inside the electrode 34 adjacent to the left end of the electrode 34 when the switch blade is actuated to the closed position shown in the drawing. In order to provide a gas seal around the piston portion 36B of the switch blade 36, a sealing member 54, which may be of the O-ring type, is disposed between the piston 36B and the inner surface of the electrode 34 for movement with the piston 36B. The sealing member 54 is preferably formed from an electrically insulating material, such as polytetrafluoroethylene, sold under the trademark "Teflon" which also has a low coefficient of friction to facilitate the sliding movement of the switch blade 36. In order to provide a gas seal around the switch blade 36 at the point where the switch blade 36 passes through an opening 45 in the spherical end 44 of the electrode 34, a sealing member 46 which may be of the O-ring type is disposed around the opening 45. The sealing member 46 is also preferably formed from an electrically insulating material which has a low coefficient of friction, such as the polytetrafluoroethylene material just mentioned. It is to be noted that the movement of the switch blade 36 during most of its travel from the open position, shown in phantom in the drawing, to the closed position, shown in full lines, would be guided at two points. The first point would be at the piston portion 36B at the rear of the switch blade 36B and the other point would be at the curved portion 44 of the electrode 34 which also acts as a guide bearing in this respect. It is also to be noted that the spherical ends 42 and 44 of the electrodes 32 and 34, respectively, may be coated with a suitable electrically insulating material having a low coefficient of friction, such as "Teflon" polytetrafluoroethylene to assist in preventing current flow through the spherical portions of the electrodes 32 and 34 during operating conditions.

In order to actuate the switch blade 36 of the disconnect switch 10 between the open and closed positions, the fluid operating means 40 is operatively connected to the electrode or shield 34 by the first and second gas passageways or lines 62 and 64, respectively, which are each connected at one end to the openings 34A and 34B, respectively, adjacent to the opposite ends of the shield or electrode 34. The gas or fluid lines 62 and 64 are formed from a suitable electrically insulating material, such as ceramic porcelain, and are secured at the outer ends to the inner surface of the switch housing 16 around the aligned openings 24B and 24C, respectively, by a suitable bonding material or cement, as indicated at 61 and 67, respectively. The insulating gas lines 62 and 64 may also be employed to assist in supporting the switch conductor 28 and the electrode 34, as well as the switch blade 36, within the switch housing 16. In order to extend the gas or fluid passageways established by the gas lines 62 and 64 beyond the outer periphery of the switch housing 16, the gas lines or tubular members 63, 65 are secured to the switch housing 16 by suitable means, such as welding, as indicated at 66 and 69 respectively, in line with the openings 24B and 24C, respectively. The gas lines 63 and 65 may be formed from a metallic or electrically conducting material since the switch housing 16 is normally maintained at substantially ground potential.

In order to selectively control the application of gas or fluid pressure to one or the other of the opposite sides of the piston portion 36B of the switch blade 36 in order to actuate the switch blade 36 between the open and closed positions, a relatively high pressure gas or fluid reservoir is provided, as indicated at 142, along with the first and second four-way selector control valves 140 and 150, respectively. More specifically, the valve 140 comprises a movable element 181 having a passageway 182 therethrough and a body portion having a plurality of ports 183, 184, 185 and 186. Similarly, the valve 150 comprises, as illustrated, a movable element 191 having a passageway 192 therethrough and a body portion including a plurality of ports 193, 194, 195 and 196 spaced around the outer periphery thereof. The fluid or gas line 63 which leads to one side of the piston portion 36B of the switch blade 36 is connected to the port 183 of the valve 140 through the valve 112, while the gas or fluid line 65 which leads to the other side of the piston portion 36B is connected to the port 193 by a gas line 115 through the valve 114. The high pressure fluid or gas reservoir indicated at 142 is connected on the one hand to the port 184 of the valve 140 to the fluid or gas line 156 and on the other hand to a port 195 of the valve 150 through a fluid or gas line 152.

In order to replenish the supply of electrically insulating fluid or gas in the high pressure fluid reservoir 142, which is preferably the same as the electrically insulating gas provided in the switch enclosure 16 as previously disclosed, gas may be exhausted from the switch enclosure 16 through one of the valves 140 or 150 into a relatively low pressure fluid or gas reservoir, as indicated at 132. The inlet of the low pressure gas or fluid reservoir 132 is connected on the one hand to the port 185 of the valve 140 through a fluid or gas line 161 and on the other hand to a port 194 of the valve 150 through a fluid or gas line 162. The outlet of the low pressure fluid or gas reservoir 132 is connected to the high pressure fluid reservoir 142 through a compressor 133 and the fluid or gas lines 174 and 153.

In considering the operation of the disconnect switch 10 it will be assumed that, initially, the disconnect switch 10 is in the closed position as shown in the drawing with a closed electric circuit being formed between the switch conductors 26 and 28 which extends from the switch conductor 26 through the electrically conducting electrode 32, the contact fingers 38, the switch blade 36, the contact surface 36A on the switch blade 36, the contact fingers 48, the electrically conducting electrode 34, and finally to the other switch conductor 28. It is also assumed that, initially, the valves 112 and 114 are both closed.

In order to actuate the switch blade 36 of the disconnect switch 10 to an open circuit position, as indicated in phantom in the drawing, the selector valve 140 is first actuated to the position shown in the drawing either manually by means of a handle (not shown) which may be provided on the movable element 181 of the valve 140 or electrically by energizing suitable means, such as a solenoid (not shown) or an electric motor (not shown), which is operatively connected to the movable element 181. In the operating position of the valve 140 shown in the drawing, the ports 183 and 184 of the valve 140 are connected by the fluid passageway 182 to form a fluid path which extends from the high pressure fluid reservoir 142 through the fluid or gas line 156 to the port 184, through the fluid passageway 182 and the port 183 to the valve 112. If the valve 112 is now opened, the fluid pressure from the high pressure fluid reservoir 142 will be applied to the left side of the piston portion 36B of the switch blade 36 through the fluid line 113, the fluid line 63, and the fluid line 62 which extends to the interior of the electrode 34 at the left side of the piston portion 36B as viewed in the drawing. It is to be noted at this time that the selector valve 150 is in an operating position as shown in the drawing which does not permit the application of a relatively high fluid pressure to the right side of its piston portion 36B. When a relatively high fluid pressure is applied to the left side of the piston portion 36B, the switch blade 36 moves toward the right until the switch blade 36 reaches its final open circuit position, as indicated in phantom in the drawing, in which the right end of the switch blade 36 bears against the end wall of the electrode 34 which may act as a stop, as indicated at 35. If the valve 114 is maintained in a closed position during an opening operation of the switch blade 36, as just described, the insulating gas which is disposed or trapped between the piston portion 36B and the valve 114 will act as a cushioning or buffer means to cushion the opening movement of the switch blade 36 until the switch blade 36 reaches its open circuit position, as indicated at 36' on the drawing. It will be noted that the O-ring gasket 54 on the piston portion 36B substantially prevents gas leakage around the piston portion 36B during the opening movement just described.

Assuming that the switch blade 36 is in the open circuit position, as indicated in phantom at 36' in the drawing, the valve 114 may then be opened to vent or reduce the gas pressure at the end of the electrode 34 to the right of the piston portion 36B of the switch blade 36. The selector valve 140 may then be actuated from the position shown in the drawing to a new operating position which is angularly displaced from the position shown in the drawing by substantially 90° in a clockwise direction to remove relatively high fluid pressure from the left side of the piston portion 36B of the switch blade 36. In the new operating position of the selector valve 140 as just described, a fluid path will be formed which extends from the interior of the switch housing 16 through the fluid lines 62, 63 and 113, through the valve 112, the port 183, the fluid passageway 182, the port 185, and through the fluid line 161 to the inlet of the relatively low pressure gas reservoir 132 to permit replenishing of the high pressure gas supply of the reservoir 142 by actuating the compressor 133, if desired.

Assuming that the selector valve 140 is actuated to the new operating position just described in which the fluid passageway 182 connects the ports 183 and 185, and assuming that the valves 112 and 114 are again both closed, the switch blade 36 of the disconnect switch 10 may be actuated from an open circuit position, as indicated in phantom in the drawing, to a closed circuit position, as indicated in full lines in the drawing, by first actuating the movable element 191 of the selector valve 150 from the position shown in the drawing, in which relatively high fluid pressure is not applied to the right side of the piston portion 36B to a new operating position which is angularly displaced from the position shown in the drawing by an angle of substantially 90° in a clockwise direction to thereby connect the ports 193 and 195 of the valve 150 by the fluid passageway 192. A relatively high fluid pressure may then be applied to the right side of the piston portion 36B of the switch blade 36 with the valve 114 in the open position along a fluid path which extends from the high pressure fluid reservoir 142, through the fluid lines 152 and 153, the port 195, the fluid passageway 192, the port 193, the valve 114, and through the fluid lines 115, 65 and 64 to the interior of the electrode 34 at the right side of the piston portion 36B. The switch blade 36 will then be actuated toward the left from the position indicated in phantom in the drawing until the left end of the switch blade 36 engages the fixed contact fingers 38 of the disconnect switch 10 and the contact area 36A on the switch blade 36 engages the contact fingers 48 inside the electrode 34, as shown in full lines in the drawing. It is to be noted that when the left end of the switch blade 36 reaches the O-ring gasket 46, and assuming that the valve 112 is closed, a quantity of electrically insulating gas will be disposed or trapped between the piston portion 36B and the valve 112 and subsequently compressed to thereby provide a cushioning or buffer means during a closing operation of the disconnected switch 10. After the switch blade 36 is actuated to the closed position shown in the drawing, the relatively high fluid pressure may be removed first from the left side of the piston portion 36B of the switch blade 36 by opening the valve 112, assuming that the valve 140 is in the position in which the ports 183 and 185 are connected and then by the fluid passageway 182 from the right side of the piston portion 36B of the switch blade 36 by returning the selector valve 150 to the position shown in the drawing in which the ports 193 and 194 are connected by the fluid passageway 192. It is to be noted that the fluid operating means 40 may be operatively disconnected from the disconnect switch 10 by closing both of the valves 112 and 114 for maintenance or other purposes.

In order to electrically connect either of the switch conductors 26 or 28 to ground potential for maintenance or other purposes to thereby insure the safety of operating personnel, a grounding switch 20, as shown in the drawing, may be provided which is disposed transversely with respect to the longitudinal dimension of the switch housing 16. The grounding switch 20 comprises a generally cylindrical housing 230, which is closed at the outer end, with the inner end of the housing 230 passing through an opening 24A provided in the switch housing 16 and being secured to the switch housing 16 by suitable means, such as welding, as indicated at 235. The inner end of the housing 230 may be formed as a flange, as indicated at 236, which bears against the interior of the switch housing 16 around the opening 24A.

The grounding switch 20 includes a reciprocating ground switch blade 210 which is slidably mounted inside the housing 230. The ground switch 20 also includes a fixed or stationary contact means 220 which is disposed inside the electrode 32 of the main disconnect switch 10 adjacent to an opening 33 provided in the electrode 32 to permit the ground switch blade 210 to engage the contact means 220 when the ground switch blade 210 is actuated to move in a radially inward direction from the position shown in the drawing to the position indicated in phantom in the drawing to engage the stationary contact means 220.

In order to permit actuation of the ground switch blade 220 by a relatively high fluid pressure, the ground switch blade 210 includes a piston portion 214 which is formed integrally therewith or mounted on the blade 210 adjacent to one end with an O-ring gasket 222 being disposed between the piston portion 214 and the inner surface of the housing 230 to substantially prevent fluid or gas leakage around the piston portion 214. The O-ring gasket 222 may be formed from the same type of material previously indicated in connection with the O-ring gaskets 46 and 54 of the disconnect switch 10 to facilitate the sliding movement of the ground switch blade 210.

In order to guide the reciprocating movement of the ground switch blade 210, a guide bearing 234 may be mounted near the end of the housing 230 adjacent to the switch housing with an O-ring gasket 242 being provided around the opening through the guide bearing 234 to substantially prevent gas or fluid leakage around the ground switch blade 210 during certain operating conditions of the grounding switch 20. The ground switch blade 210 also includes an enlarged contact portion or area 212 which is adapted to engage a plurality of spaced, fixed contact fingers 232 which are mounted inside the ground switch housing 230 adjacent to the guide bearing 234, as illustrated.

In order to permit the application of relatively high fluid pressure to one or the other of the sides of the piston portion 214 of the ground switch blade 210, the first and second fluid lines 262 and 264 respectively are operatively connected to the ground switch housing 230 at spaced points along the longitudinal dimension of the switch housing 230. The fluid line 262 is connected through the valve 122 and the fluid line 172 to the port 186 of the selector valve 140, while the fluid line 264 is connected to the port 196 of the selector valve 150 through the valve 124 and the fluid line 154. It is to be noted that in the disclosed arrangement, the ground switch 20 may be actuated by the same fluid operating means 40 which operates the main disconnect switch 10, as previously described.

Considering the operation of the grounding switch 20, it will be assumed initially that the grounding switch 20 is in the open circuit position shown in the drawing and that the valves 122 and 124 are both closed. If it is desired to actuate the ground switch blade 210 to a closed circuit position with respect to the fixed contact means 220 on the switch conductor 26, the selector valve 150 is first actuated from the position shown in the drawing to a new operating position which is angularly displaced from the position shown in the drawing by an angle of substantially 180° in either direction until the fluid passageway 192 connects the ports 195 and 196 of the selector valve 150. The valve 124 may then be open to establish a fluid or gas path between the high pressure fluid reservoir 142 and the outer or lower side of the piston portion 214 of the ground switch blade 210, as viewed in the drawing, which extends from the high pressure fluid reservoir 142 through the fluid lines 152 and 153, the port 195, the fluid passageway 192, the port 196, the fluid line 154, the valve 124, and the fluid line 264 to the interior of the ground switch housing 230 between the piston portion 214 and the closed end of the ground switch housing 230. The ground switch blade 210 is then actuated by the relatively high fluid pressure applied to the lower side of the piston portion 214 to thereby actuate the ground switch blade 210 from the normal open position, as shown in the drawing, outside of the switch housing 16 to a closed circuit position with respect to the ground contact means 220 which is disposed inside the switch housing 16 and inside the electrode 32. It is to be noted that in the closed circuit position of the ground switch blade 210, indicated in phantom in the drawing, most of the length of the switch blade 210 is disposed inside the housing 16.

Assuming that the valve 122 remains closed during the closing operation of the ground switch 20 as just described, the closing movement of the ground switch blade 210 toward the end of its movement will be cushioned or buffered by the electrically insulating gas which is compressed between the piston portion 214 of the ground switch blade 210 and the valve 122. It is to be noted that the O-ring gasket 222 disposed between the piston portion 214 and the interior of the ground switch housing 230 substantially prevents gas leakage around the piston portion 214 of the blade 210 during the reciprocating movement of the ground switch blade 210. When the ground switch blade 210 is actuated to the closed position with respect to the stationary contact means 220 inside the switch housing 16, a closed electrical circuit is then formed which extends between the switch conductor 26 of the disconnect switch 10 through the conducting electrode 32, the fixed contact means 220, the ground switch blade 210, the contact fingers 232, and finally to the conducting housing 230 which may be electrically connected to ground potential by means of a ground terminal (not shown) which is conveniently mounted on the exterior of the grounding switch housing 230.

Assuming that the ground switch 20 is in a closed circuit position, as indicated in phantom in the drawing, the relatively high fluid pressure may be removed first from the upper side by opening the valve 122, assuming that the valve 140 is in the position in which the ports 185 and 186 are connected by the fluid passageway 182, and then from the lower side of the piston portion 214 by actuating the movable element 191 of the selector valve 150 to a position which is angularly displaced from that shown in the drawing by an angle of substantially 90° in a counterclockwise direction assuming that the valve 124 which is mounted in the fluid line 154 is open. The ground switch blade 210 may then be returned to the normal open circuit position shown in the drawing by first actuating the selector valve 140 from the operating position shown in the drawing to a new operating position which is angularly displaced from the operating position shown in the drawing by an angle of substantially 90° in a counterclockwise direction to thereby connect the ports 184 and 186 through the fluid passageway 182 of the selector valve 140.

Assuming that the valve 122 is open, a fluid path is established by the actuation of the valve 140 just described which extends from the high pressure fluid reservoir 142 through the fluid line 156, the port 184, the fluid passageway 182, the port 186, the fluid line 172, the valve 122, and the fluid line 262 to the interior of the ground switch housing between the contact fingers 232 and the upper side of the piston portion 214 of the ground switch blade 210, as viewed in the drawings. When the ground switch blade 210 is in the closed circuit position with respect to the associated fixed contact means 220, as indicated in phantom in the drawing, the ground switch blade 210 will be actuated out of engagement with the associated fixed contact means 220 by the application of a relatively high fluid pressure to the upper side of the piston portion 214 of the ground switch blade 210, as established in the manner just described, until the ground switch blade 210 reaches the normal open position as shown in full lines in the drawing in which the bottom of the switch blade 210 bears against the end wall 231 of the housing 230 which acts as a stop. It is to be noted that the O-ring gasket 242 provided in the guide bearing portion 234 of the ground switch housing 230 substantially prevents leakage of gas around the ground switch blade 210 during both opening and closing movements of the ground switch blade 210 and that if the valve 124 is in a closed position, the electrically insulating gas between the piston portion 214 and the valve 124 will be compressed and act as a cushioning or buffer means during the opening operation of the ground switch 20.

In order to compartmentalize the disconnect switch 10 and the associated bus structures which may be combined in an overall substation structure, the combined insulator and barrier units 70 are provided at the desired locations throughout the substation structure. For example, by providing a combined insulator and barrier unit 70 at each end of the disconnect switch 10, as shown in the drawing, the housing of the disconnect switch 10 can be entered for maintenance or the switch 10 can be replaced readily without causing loss of insulating gas in other parts of the overall system. When energized and operating, the pressurized disconnect switch 10 and the associated bus structures are interconnected and the insulating gas can circulate freely between the components which make up the overall substation.

The combined insulator and barrier unit 70 may be of the type which is more fully described in copending application Ser. No. 474,794, filed July 26, 1965, by D. L. Whitehead which issued July 18, 1967 as U.S. Patent 3,331,911 and which is assigned to the same assignee as the present application. Briefly, the combined insulator and barrier unit 70 includes a generally disc-shaped insulator 71 which is mounted in the space between two conducting members 72 and 73 which are in turn connected to the associated conductors 22 and 26, respectively, or 22 and 28, respectively, with the outer rim of the insulator 71 being sealed between the spaced portions of flanges 82 and 84 on the bus conductor housing 17 and the switch housing 16, respectively, with the gasket 86 compressed by drawing the flanges 82 and 84 together by means of bolts (not shown).

As shown in the drawing, the cylindrical switch housing 16 is of a larger diameter or cross sectional area than each of the adjoining bus conductor housings 17, in order to provide the necessary electrical insulating clearances between the switch housing 16 and the different portions of the disconnect switch 10. The ends of the switch housing 16 are curved inwardly, as indicated at 13, to a diameter or cross-sectional size corresponding to that of the bus conductor housing 17. Each end of the switch housing 16 has a flat portion 18 between two curved portions to provide sufficient flexibility in the housing ends 13 to permit a limited degree of axial movement of the different housings due to their thermal expansion and contraction.

It is to be understood that a grounding switch structure as disclosed may be applied to ground either of the switch conductors which are bridged by the main switch blade when the disconnect switch 10 is closed in a particular application. It is also to be understood that the fluid lines which are connected to the electrode 34 of the disconnect switch 10 may pass through suitable passageways provided in a combined insulator and barrier unit of the type which is disclosed in detail in copending application Ser. No. 474,794, previously mentioned.

The apparatus embodying the teachings of this invention has several advantages. For example, if the fluid pressure applied to the piston portion of the main disconnect switch 10 or to the piston portion of the grounding switch 20 is relatively higher than the insulating fluid pressure inside the switch housings 16, the fluid seals between the different portions of the operating parts of the disconnect switch 10 and the grounding switch 20 are less critical since any insulating gas which escapes into the switch housing 16 or the associated bus conductor housings would be relatively insignificant in the overall volume of the substation switch and bus conductor housings. In addition, no special gaskets are required at the point where the fluid lines enter the switch housing since these may be closed and otherwise sealed by suitable means, such as welding. A further advantage lies in the fact that the control or selector valves of the fluid operating means 40 are all disposed externally of the switch housing for convenient maintenance or other purposes.

Since numerous changes may be made in the above described apparatus and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A disconnect switch comprising a generally hollow, cylindrical housing substantially filled with an electrically insulating gas under pressure, first and second conductors spaced axially within the housing, electrically insulating means for supporting the conductors within the housing and for closing off the gas space within the housing at the ends thereof, generally hollow, cylindrical corona shields attached to each of the conductors, the adjacent ends of the corona shields being spaced from one another and having axially aligned openings therein, first fixed contact means disposed within one of the corona shields and electrically connected to the associated conductor, additional fixed contact means disposed within the other corona shield, a switch blade having a piston formed integrally therewith near one end and disposed within the other corona shield, the switch blade being reciprocally movable to engage both the first fixed and the additional fixed contact means, and means operatively connected to the other corona shield for selectively applying electrically insulating gas under pressure to the opposite sides of the piston to actuate the switch blade between open and closed positions with respect to both the first and the additional fixed contact means.

2. The combination as claimed in claim 1 wherein the opening in the other corona shield, in which the piston is disposed, is substantially closed by the switch blade during closing with the gas inside the corona shield between the piston and one end of the corona shield being compressed by the movement of the piston after the closing of the opening to cushion the final movement of the switch blade during closing and in which the last-mentioned means includes at least a pair of axially spaced fluid lines formed from an electrically insulating material which extend from said other corona shield to the housing and assist in supporting said other corona shield and said switch blade.

3. The combination as claimed in claim 1 wherein the electrically insulating gas of the last-mentioned means is of a predetermined pressure which is relatively higher than that of the electrically insulating gas provided in the cylindrical housing.

4. A disconnect switch comprising a generally hollow, cylindrical main housing substantially filled with an electrically insulating gas under pressure, first and second hollow conductors disposed within the housing, the ends of the conductors being axially spaced from one another; generally hollow cylindrical corona shields attached to the ends of each of the conductors axially spaced, electrically insulating means for supporting the conductors within the housing and for closing off the gas space within the housing at the ends thereof; a first axially movable switch member connecting the spaced ends of the conductors, the switch member telescoping into one of the conductors to open the switch; means operatively connected with the movable switch member for actuating the switch member between open and closed positions with respect to the spaced ends of the conductors; stationary contact means mounted on one of said conductors and inside the associated corona shield, the last-mentioned corona shield including an opening adjacent to said contact means; a reciprocating ground blade slidably supported within an auxiliary housing to move transversely with respect to the hollow conductors at least partially into the main housing and through the opening in the last-mentioned corona shield to engage the contact means and to move out of the main housing to disengage the contact means; and means for actuating the ground blade into and out of engagement with respect to the contact means.

5. The combination as claimed in claim 4 wherein the ground blade includes a piston formed integrally therewith and the last-mentioned actuating means includes means for selectively applying an electrically insulating gas under pressure to the opposite sides of the piston on the ground blade for actuating the ground blade into and out of the housing to engage and disengage the contact means.

6. The combination as claimed in claim 4 wherein a second cylindrical housing is mounted transversely on the first-mentioned housing with the ground blade slidably supported in the second housing to pass through an opening in the first-mentioned housing to engage the associated contact means and additional fixed contact means are disposed inside the second cylindrical housing to be engaged by the ground blade when the ground blade moves into the first-mentioned housing.

7. A ground switch comprising a generally hollow, cylindrical housing substantially filled with an electrically insulating gas and having an opening therein, at least one axially extending conductor disposed within the housing, electrically insulating means for supporting the conductor within the housing and for closing off the gas space within the housing at the ends thereof, an elongated auxiliary housing disposed transversely with respect to the first-mentioned housing and having one end bearing against the first-mentioned housing around the opening therein, a reciprocally movable ground switch blade slidably supported within the auxiliary housing to move at least partially into and out of the first-mentioned housing, said ground switch blade having a piston mounted thereon, contact means mounted on the conductor within the first-mentioned housing in the line of movement of the ground switch blade to be engaged by and disengaged from the ground switch blade when the latter blade moves into and out of the first-mentioned housing and means for actuating the ground switch blade into and out of the first-mentioned housing, said actuating means including means operatively connected to the auxiliary housing for selectively applying an insulating fluid under pressure to the opposite sides of the piston on the ground switch blade to actuate the ground switch blade into and out of the first mentioned housing to engage and disengage the associated contact means.

References Cited

UNITED STATES PATENTS

| 2,604,562 | 7/1952 | Paul | 200—148 |
| 2,889,436 | 6/1959 | Albright | 200—48 X |

FOREIGN PATENTS

| 362,450 | 6/1962 | Switzerland. |

ROBERT S. MACON, *Primary Examiner.*

ROBERT K. SCHAEFER, *Examiner.*

H. J. HOHAUSER, *Assistant Examiner.*